Oct. 29, 1968  L. A. COPAS  3,407,733
WEATHER DIFFUSING APPARATUS
Filed Oct. 21, 1965
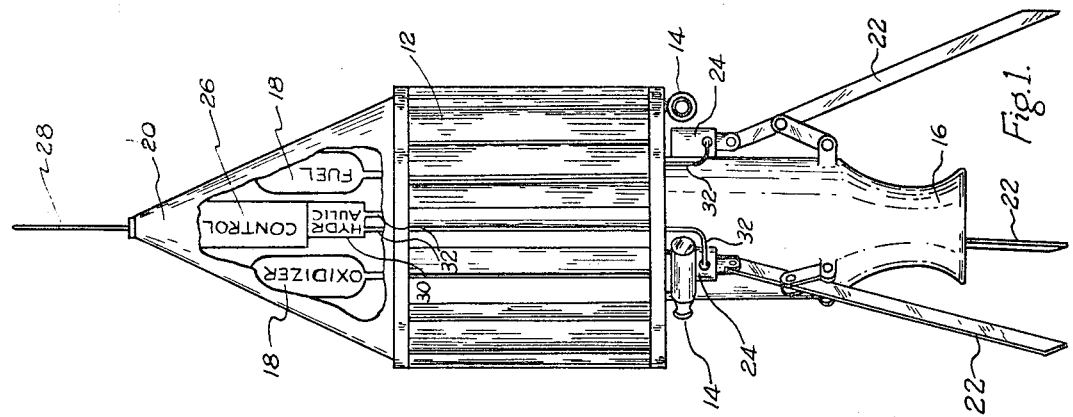
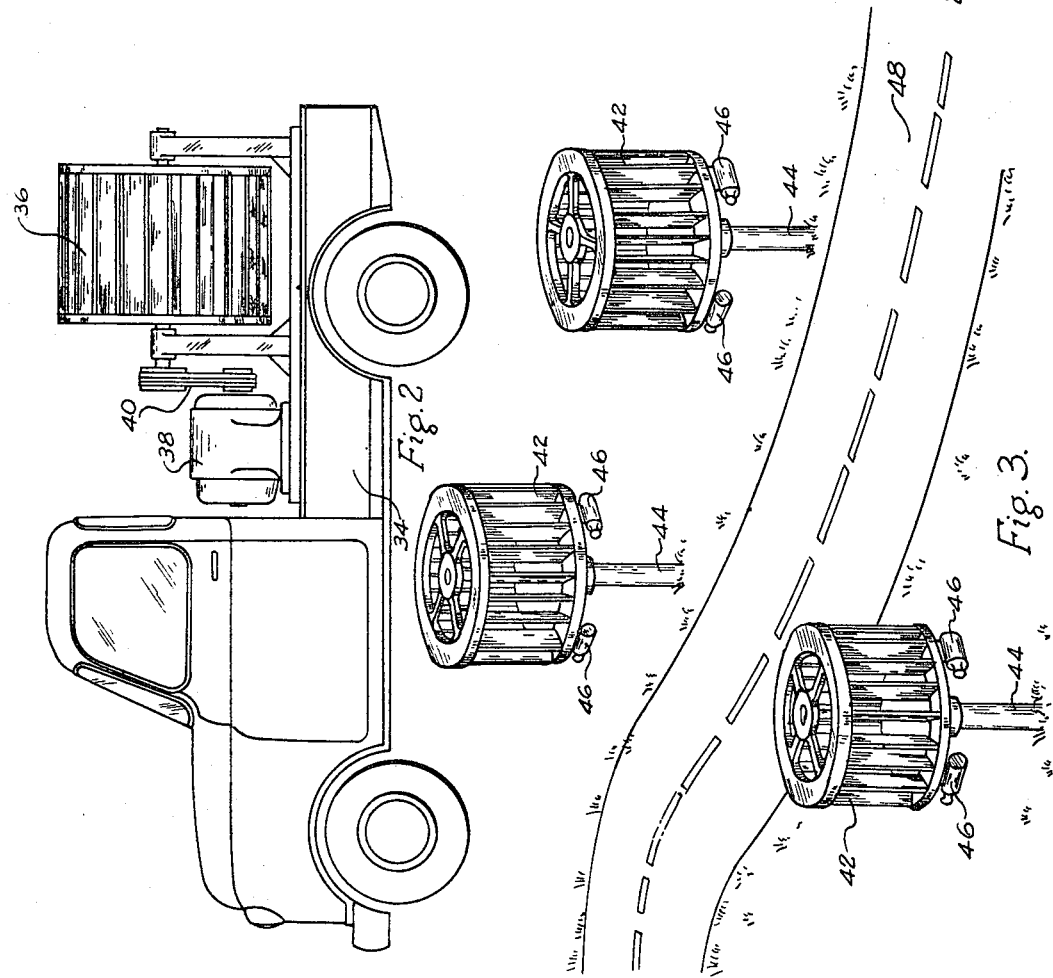

United States Patent Office 3,407,733
Patented Oct. 29, 1968

3,407,733
WEATHER DIFFUSING APPARATUS
Lee A. Copas, 2510 Angelle Drive,
Port Arthur, Tex. 77640
Filed Oct. 21, 1965, Ser. No. 499,353
10 Claims. (Cl. 102—34.2)

ABSTRACT OF THE DISCLOSURE

Apparatus and method for dispersing a localized weather condition which includes, a main body member, a centrifugal fan rotatably mounted about the body member with its air directing blades exposed to the outside atmosphere, and adapted to distribute air radially outwardly and form an annular body of moving air about the fan means, and a mechanism for driving the centrifugal fan means, preferably a plurality of solid propellant rockets mounted about the periphery of the fan means. In one form, a plurality of the units are mounted at predetermined points along a highway or other local area subject to fog conditions, in a second form the units are mounted on a mobile land vehicle and driven through the area having a localized fog or other weather condition, and finally in a third mode of use, the unit is provided with a nose cone, a tripod stand and an axially propelling rocket to carry the rocket to an above surface location of a localized weather condition and radio controlled means are utilized to fold the support and actuate the rocket elements which rotate the fan.

---

The present invention relates to a method and apparatus for breaking-up localized weather conditions. In a more specific aspect, the present invention relates to a method and apparatus for dispersing localized weather conditions, where such weather conditions are accompanied by a condition of calm air or a particular pattern of air movement.

Normally heavy storm clouds, severe weather conditions, such as, tornadoes and hurricanes, concentrations of fog and frost are localized conditions, and accordingly, capable of being dispersed or diffused by local action. In the case of cloud concentrations, tornadoes and hurricanes, this action can be a disturbance of the normal air patterns and currents. In other instances, such as fog or frost conditions, where the undesired weather condition is accompanied by a condition of calm air, the action to disperse or diffuse this weather condition can be the creation of a substantial movement of the air.

It is therefore an object of the present invention to provide an improved method and apparatus for breaking-up localized weather conditions.

A further object of the present invention is to provide an improved method and apparatus for diffusing localized weather conditions wherein a substantial centrifugal movement of the air is created.

These and other objects and advantages of the present invention will be apparent from the following detailed description when read in conjunction with the drawings wherein:

FIGURE 1 shows the preferred weather diffusing apparatus of the present invention;

FIGURE 2 shows a weather diffusing mechanism for diffusing localized, ground weather conditions; and FIGURE 3 shows still another means for diffusing localized ground weather conditions.

The preferred embodiment of the present invention is shown in FIGURE 1 of the drawings. In FIGURE 1 the numeral 10 designates the main body portion of the device. Surrounding the main body portion is a multi-blade centrifugal fan 12, which upon rotation is adapted to create substantial, centrifugal movement of the air surrounding the main body portion 10. Fan 12 may be fixedly attached to body 10 and the entire body and fan may be adapted to rotate. Preferably, however, fan 12 is adapted to rotate about body 10 and independently of any rotation of body 10. Rotation of fan 12 is created by a plurality of small rockets 14, preferably containing a solid propellant. If fan 12 is fixed to the apparatus and the entire apparatus is to be rotated, rockets 14 may be used or internal fins in propulsion rocket 16 may be used in a conventional manner. The entire mechanism is propelled through the atmosphere by rocket 16. Rocket 16 may also contain a suitable solid propellant; but, preferably, is fueled by a liquid fuel stored in appropriate tanks 18 in upper section 20 of body 10. The mixing of the liquid fuel and its utilization to propel the device are well known in the art. The entire mechanism is mounted on a tripod support including legs 22. Legs 22 are adapted to be folded against rocket 16 when the rocket is in flight. Such folding is accomplished hydraulically by the upward movement of a piston (not shown) mounted within hydraulic cylinders 24, which piston is pivotally attached to the upper ends of legs 22. The flight and operation of the rocket is accomplished by a radio control mechanism 26, which is also mounted in section 18 of body 10. This control mechanism is in communication with a ground location through arial 28. The control mechanism is also adapted to fire rocket 16 at the appropriate time and at a later appropriate time to fire rockets 14, thereby causing rotation of fan 12. The remote control mechanism 28 is also adapted to operate hydraulic mechanism 30 which supplies fluid under pressure to pistons 24 through hydraulic fluid lines 32.

FIGURE 2 illustrates another mechanism for carrying out the present invention. Specifically, the dispersing apparatus may be mounted on an appropriate mobile, earth-based vehicle, such as truck 34. Mounted on the bed of truck 34, or at some other appropriate location, is centrifugal fan means 36. In the particular embodiment shown, fan 36 is operated by engine 38, through belt 40. Obviously, engine 38 may be an electrical motor or a gasoline engine, preferably the latter. It should also be recognized, however, that fan 36 may be propelled by rotary rockets, such as rockets 14 of FIGURE 1. Where an "earth-based vehicle" is referred to herein the term is meant to include land-based automotive vehicles as well as water-based boats. It is obvious from the above that the device may therefore be utilized to disperse local fog or the like along a highway or in a body of water.

FIGURE 3 shows still another variation of the present invention. In accordance with FIGURE 3 a plurality of centrifugal fans 42 are mounted on appropriate supports 44 along a highway 46. Centrifugal fans 42 may be permanently placed along a section of highway generally subject to fog conditions, or they may be temporarily so mounted as by having supports 44 fixed in position and fans 42 removable therefrom. Centrifugal fans 42 may be rotated by rotary rockets 46. While, in this particular use, solid propellant rotary rockets are preferable, fans 42 could be driven by appropriate engines, since a small, high speed engine will normally be adequate. The arrangement shown in FIGURE 3 is also adaptable to use in orchards or the like to overcome frost conditions and the like. In this instance, fans 42 may be vertically mounted, as shown, or horizontally mounted, the primary purpose of course being to overcome the condition of calm which normally accompanies a frost condition. The movement of the air may also be supplemented by appropriate heaters, and, in this manner, the heat will be better distributed and moved to points where it is most needed.

While specific examples have been given and specific devices illustrated, it is to be understood that such examples and illustrations are to teach those skilled in the art the nature of the present invention; and, therefore, the invention is to be limited only in accordance with the appended claims.

I claim:
1. Apparatus for dispersing a localized weather condition above the surface of the earth, comprising:
  (a) a main body member havng a cone-shaped upper portion and a cylindrical lower portion;
  (b) centrifugal fan means having a plurality of blades disposed in fixed, generally radial planes with respect to the center of said body member, and rotatably mounted about said cylindrical lower portion of said body member with its air directing blades exposed to the outside atmosphere and adapted to distribute air radially outwardly and form an annular body of moving air about said fan means;
  (c) solid propellant, rotary rocket means, adapted to rotate said fan means about said body member simultaneously with the hereinafter mentioned propulsion, mounted adjacent the periphery of said fan means;
  (d) propulsion rocket means, adapted to propel said body member through the air mounted on the lower end of said cylindrical portion of said body member;
  (e) support means, including foldable tripod support means, adapted to be folded against said propulsion rocket during flight and to be extended to support said main body member and said propulsion rocket when not in flight, mounted on said propulsion rocket and hydraulic means adapted to fold and unfold said support; and
  (f) radio-actuated, remote control means, adapted to actuate said propulsion rocket, actuated said hydraulic means to fold said support means and actuate said rotary rocket means when the device has reached the locale of said localized weather condition, mounted within said main body member.

2. Apparatus for dispersing a localized weather condition, comprising:
  (a) a main cylindrical body member;
  (b) centrifugal fan means rotatably mounted about said said body member with its air direction blades exposed to the outside atmosphere and having a plurality of blades disposed in fixed, generally radial planes, with respect to the center of said body member, and having said blades exposed to the outside atmosphere to generated a substantial, centrifugal movement of the air surrounding said fan means;
  (c) propulsion rocket means mounted on the lower end of said main cylindrical body member for propelling said fan means to the locale of said weather condition above the surface of the earth; and
  (d) driving means, adapted to rotate said fan means while said fan means is being propelled through the locale of said weather condition, operatively coupled to said fan means.

3. Apparatus in accordance with claim 2 wherein the centrifugal fan means is fixedly coupled to the propulsion rocket means and the driving means is adapted to rotate the entire apparatus.

4. Apparatus in accordance with claim 2 wherein the centrifugal fan means is rotatably coupled to the propulsion rocket means and the driving means is adapted to rotate said fan independently of the remainder of the apparatus.

5. Apparatus in accordance with claim 2 wherein the driving means is a rotary rocket means mounted adjacent the periphery of the fan means.

6. Apparatus in accordance with claim 5 wherein the rotary rocket means includes a plurality of solid propellant rockets.

7. Apparatus in accordance with claim 2 which includes suport means for supporting the apparatus on the earth.

8. Apparatus in accordance with claim 7 wherein the support means includes a tripod type support adapted to be folded to present a streamlined profile when in flight and to be unfolded for support when not in flight.

9. Apparatus in accordance with claim 8 wherein the tripod mechanism is folded and unfolded by hydraulic means.

10. Apparatus in accordance with claim 2 which includes radio-actuated, remote control means adapted to ignite said propulsion rocket and said rotary rocket.

References Cited
UNITED STATES PATENTS

| | | | |
|---|---|---|---|
| 310,598 | 1/1885 | Linton | 102—34.2 |
| 2,371,629 | 3/1945 | Lee | 244—114 X |
| 2,522,667 | 9/1950 | De Land | 244—114 X |
| 2,632,978 | 3/1953 | Fetrow et al. | 239—2 X |
| 2,968,164 | 1/1961 | Hanson. | |
| 3,135,466 | 6/1964 | Reid | 239—2 X |
| 3,233,547 | 2/1966 | Fletcher | 102—49 |

SAMUEL W. ENGLE, *Primary Examiner.*